(12) United States Patent
Hammarlund et al.

(10) Patent No.: US 7,797,683 B2
(45) Date of Patent: Sep. 14, 2010

(54) DECOUPLING THE NUMBER OF LOGICAL THREADS FROM THE NUMBER OF SIMULTANEOUS PHYSICAL THREADS IN A PROCESSOR

(75) Inventors: Per H. Hammarlund, Hillsboro, OR (US); Stephan J. Jourdan, Portland, OR (US); Pierre Michaud, Bruz (FR); Alexandre J. Farcy, Hillsboro, OR (US); Morris Marden, Hillsboro, OR (US); Robert L. Hinton, Hillsboro, OR (US); Douglas M. Carmean, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1302 days.

(21) Appl. No.: 10/745,527

(22) Filed: Dec. 29, 2003

(65) Prior Publication Data
US 2005/0193278 A1 Sep. 1, 2005

(51) Int. Cl.
G06F 9/44 (2006.01)
(52) U.S. Cl. .................................................. 717/127
(58) Field of Classification Search ................ 717/100, 717/148–155, 126–127
See application file for complete search history.

(56) References Cited

U.S. PATENT DOCUMENTS

| | | | | |
|---|---|---|---|---|
| 5,442,797 A | * | 8/1995 | Casavant et al. | 717/149 |
| 5,535,393 A | * | 7/1996 | Reeve et al. | 717/149 |
| 5,613,136 A | * | 3/1997 | Casavant et al. | 712/28 |
| 5,815,727 A | | 9/1998 | Motomura | |
| 5,913,925 A | * | 6/1999 | Kahle et al. | 712/206 |
| 5,999,734 A | * | 12/1999 | Willis et al. | 717/149 |
| 6,192,514 B1 | * | 2/2001 | Lurndal | 717/149 |
| 6,496,925 B1 | * | 12/2002 | Rodgers et al. | 712/244 |
| 6,557,064 B1 | * | 4/2003 | Galloway | 710/260 |
| 6,708,269 B1 | * | 3/2004 | Tiruvallur et al. | 712/225 |

(Continued)

OTHER PUBLICATIONS

Marr, D.T., et al.: Hyper-Threading Technology Architecture and Microarchitecture, Intel Technology Journal Intel Corp USA, [Online] No. 1, 2002, XP002378250 ISSN: 1535-864X, retrieved from the Internet: URL:http://courses.ece.uiuc.edu/ece511/papers/Marr.2002.9tj.pdf> [retrieved on Apr. 24, 2006].

(Continued)

Primary Examiner—Ted T Vo
(74) Attorney, Agent, or Firm—Kenyon & Kenyon LLP

(57) ABSTRACT

Systems and methods of managing threads provide for supporting a plurality of logical threads with a plurality of simultaneous physical threads in which the number of logical threads may be greater than or less than the number of physical threads. In one approach, each of the plurality of logical threads is maintained in one of a wait state, an active state, a drain state, and a stall state. A state machine and hardware sequencer can be used to transition the logical threads between states based on triggering events and whether or not an interruptible point has been encountered in the logical threads. The logical threads are scheduled on the physical threads to meet, for example, priority, performance or fairness goals. It is also possible to specify the resources that are available to each logical thread in order to meet these and other, goals. In one example, a single logical thread can speculatively use more than one physical thread, pending a selection of which physical thread should be committed.

16 Claims, 4 Drawing Sheets

U.S. PATENT DOCUMENTS

| | | | |
|---|---|---|---|
| 7,039,794 B2 * | 5/2006 | Rodgers et al. | 712/244 |
| 7,085,670 B2 * | 8/2006 | Odom et al. | 702/127 |
| 7,103,586 B2 * | 9/2006 | Holenstein et al. | 707/1 |
| 7,127,561 B2 * | 10/2006 | Hill et al. | 711/145 |
| 7,155,708 B2 * | 12/2006 | Hammes et al. | 717/155 |
| 2003/0018680 A1 | 1/2003 | Iglesias et al. | |

OTHER PUBLICATIONS

Eric Bron: Re: What about speculative execution? [Online] Oct. 20, 2000, XP002378251 Retrieved fro the Internet: URL:http://www.aceshardware.com/forums/read_post.jsp?id=20009849&formumid=1> [retrieved on Apr. 24, 2006].

* cited by examiner

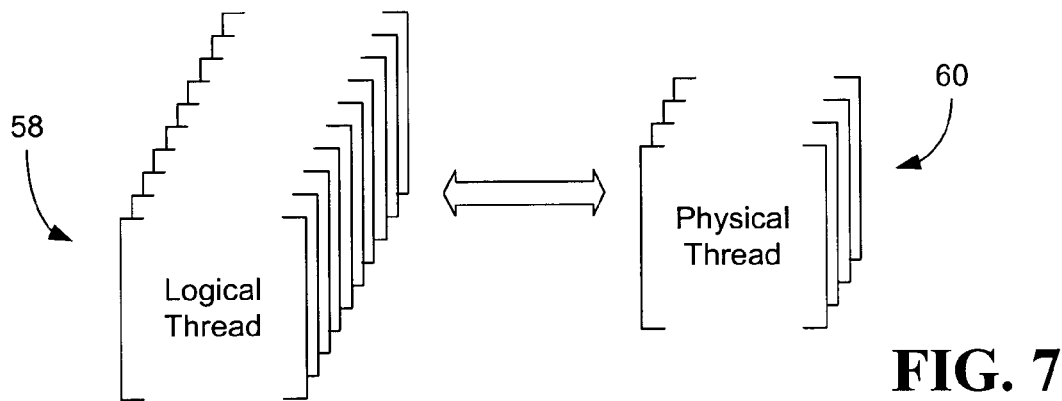
FIG. 6
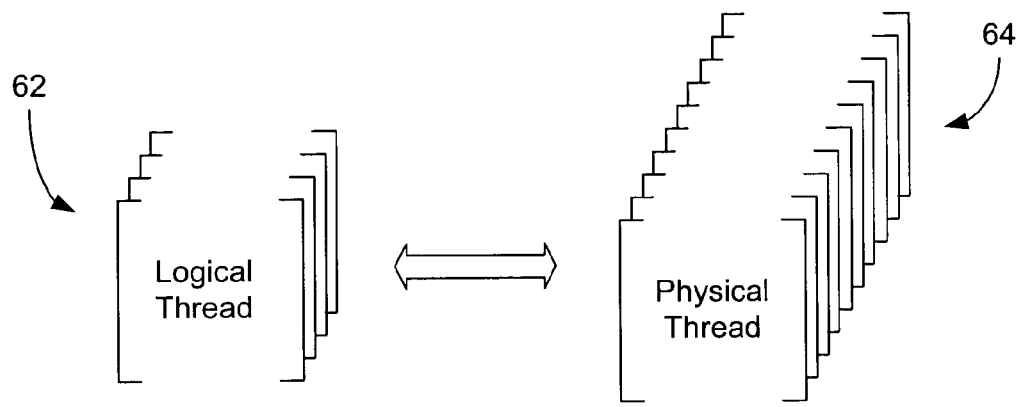
FIG. 7
FIG. 8

DECOUPLING THE NUMBER OF LOGICAL THREADS FROM THE NUMBER OF SIMULTANEOUS PHYSICAL THREADS IN A PROCESSOR

BACKGROUND

1. Technical Field

Embodiments of the present invention generally relate to computers. More particularly, embodiments relate to the enhancement of computer architectures having simultaneous threads of execution.

2. Discussion

As the demand for enhanced functionality in modern day computers continues to grow, a number of challenges are presented to processor designers as well as manufacturers. For example, a steady increase in the usage of Internet and multi-media applications has resulted in multiple processes, or threads of execution, simultaneously demanding access to processor and memory resources. While advances such as hyper-threading, which enables a single processor to run multiple threads simultaneously, have increased processor throughput, considerable room for improvement remains. In particular, the conventional approach is to couple the logical component of the thread to the physical component of the thread. Unfortunately, coupling the logical component of the thread to the physical component of the thread can present problems with regard to throughput as well as speculation. For example, one approach to increasing throughput would be to increase the number of simultaneous threads. Physical resources in a given processor are limited, however, by a number of cost factors that relate to design as well as manufacturing. As a result, the extent to which processor throughput can be increased by increasing the number of threads is constrained by practical concerns. There is therefore a need for a multi-threading approach that enables the effective number of simultaneous threads to be increased without requiring an increase in the actual number of threads.

Furthermore, speculation, which would enable the logical component to execute on more than one of the thread physical components, cannot be achieved under the conventional technique of coupling the logical component of each thread to the physical component of the thread. As a result, the extent to which processor performance can be improved is also limited. There is therefore a need for a multi-threading approach that enables speculative execution.

BRIEF DESCRIPTION OF THE DRAWINGS

The various advantages of the embodiments of the present invention will become apparent to one skilled in the art by reading the following specification and appended claims, and by referencing the following drawings, in which:

FIG. 6 is a diagram of a thread management table according to one embodiment of the invention;

FIG. 7 is a diagram of an example of a throughput mode of operation according to one embodiment of the invention;

FIG. 8 is a diagram of an example of a speculative mode of operation according to an alternative embodiment of the invention.

DETAILED DESCRIPTION

Figure 1:
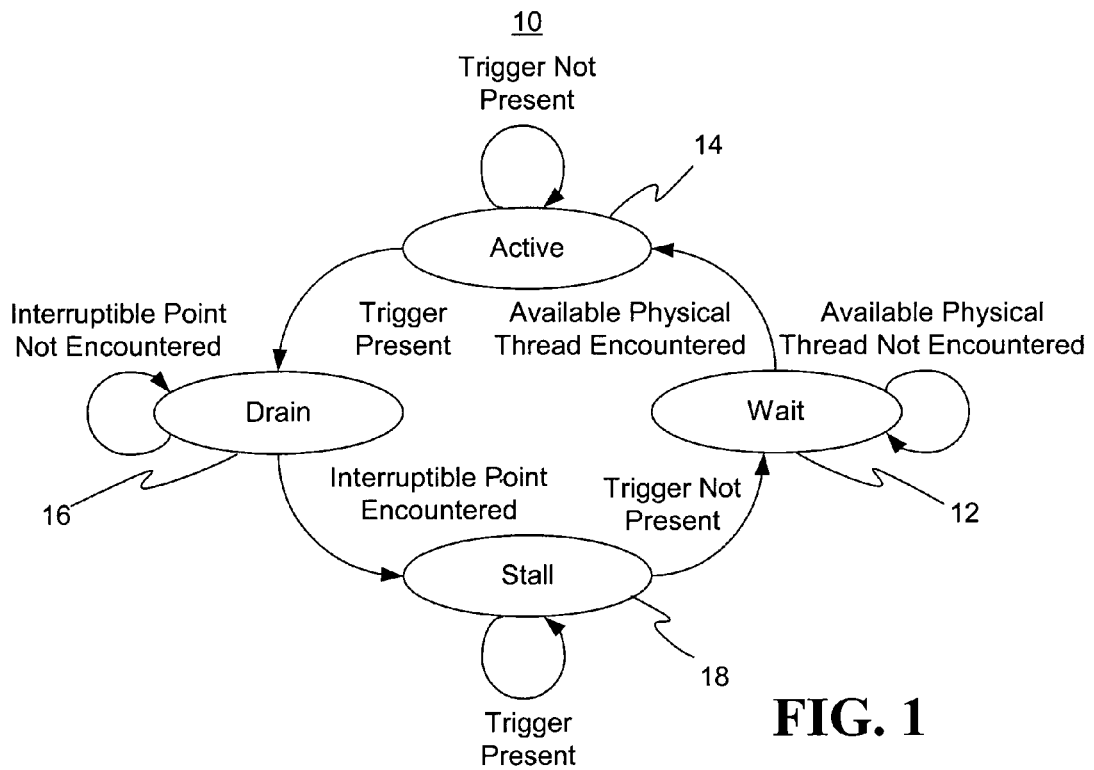
FIG. 1 is a diagram of an example of a state machine according to one embodiment of the invention.

Systems and methods of managing threads provide for supporting a plurality of logical threads with a plurality of simultaneous physical threads in order to achieve greater efficiency without the manufacturing and design drawbacks associated with conventional approaches. FIG. 1 shows a diagram 10 that represents a technique of maintaining each of a plurality of logical threads in one of a wait state 12, an active state 14, a drain state 16 and a stall state 18. Each logical thread remains in the active state 14 until one or more triggering events are present, where the triggering events can relate to any number of concerns such as latency, fairness, priority, etc. When a triggering event is present, the logical thread enters the drain state 16 in which the processor looks for an interruptible point in the logical thread. An interruptible point is a defined as a point for which the state of the logical thread can be saved. The interruptible point also depends upon the type of triggering event encountered. Once an interruptible point is encountered, the logical thread is placed in the stall state 18 until either none of the triggering events are present or another event having higher priority than the original triggering event is signaled. When either of these cases exist, the logical thread is switched to the wait state 12. For example, when the triggering event is a cache miss, the logical thread remains in the stall state 18 until the cache miss has been serviced from memory. The logical thread remains in the wait state until an available physical thread is encountered and the logical thread can be switched to the active state 14. Thus, as logical threads are "evicted" from the active state 14, other logical threads can be seemlessly switched into the active state 14. As a result, a unique decoupling effect is obtained between the logical threads and the simultaneous physical threads.

Figures 2, 3:
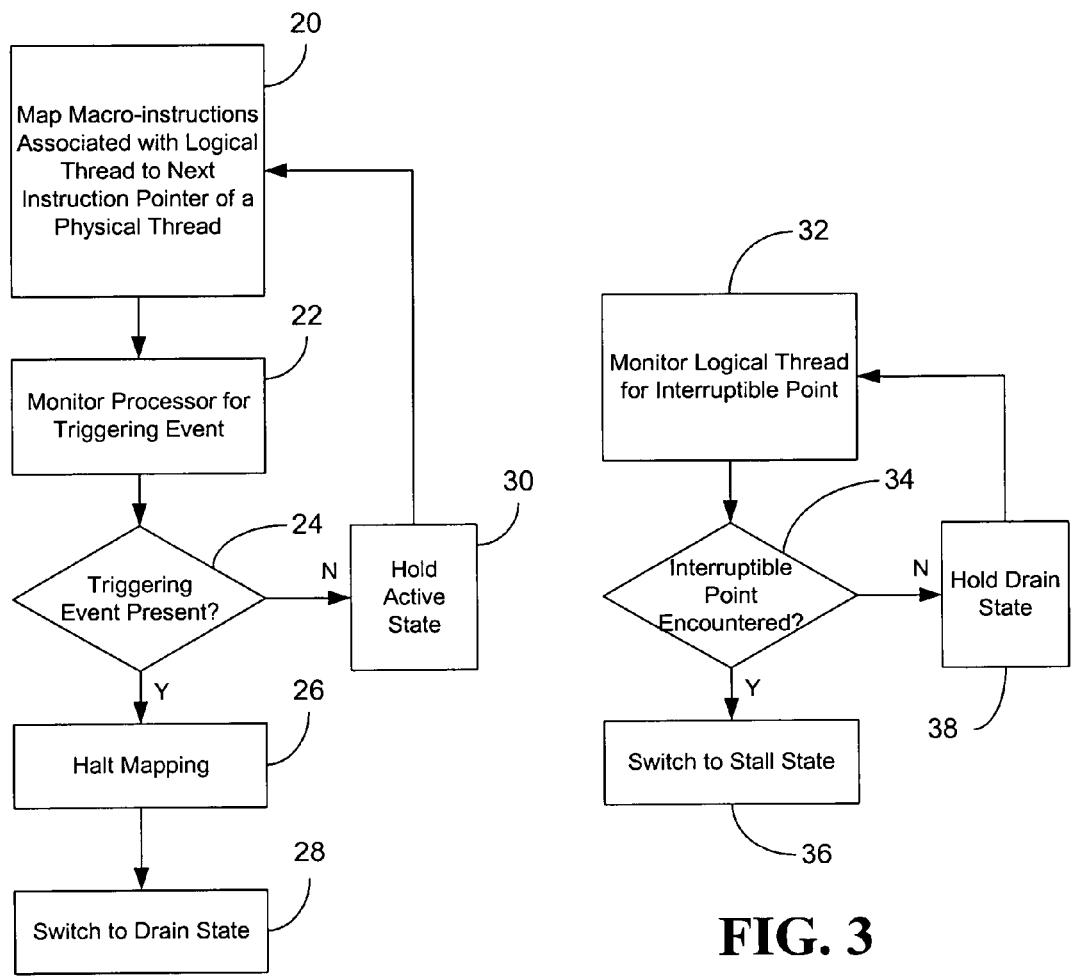
FIG. 2 is a flowchart of an example of a process of maintaining a logical thread in an active state according to one embodiment of the invention.
FIG. 3 is a flowchart of an example of a process of maintaining a logical thread in a drain state according to one embodiment of the invention.

Turning now to FIG. 2, one approach to maintaining a logical thread in the active state is shown in greater detail. Specifically, processing block 20 provides for mapping macro-instructions associated with a logical thread to a next instruction pointer (NIP) of a physical thread. A logical thread can be viewed as being a sequence of macro-instructions, which are decoded into micro-operations (or uops). For example, a "call" macro-instruction might be decoded into "store", "test" and "jump" uops. Each simultaneous physical thread has a corresponding NIP which effectively represents the address of the macro-instruction to be processed. Accordingly, as macro-instructions of a given logical thread are mapped to the NIP, they can be fetched, decoded to uops, and fed to the remainder of the processor pipeline.

These techniques apply equally to reduced instruction set computer (RISC) architectures and complex instruction set computer (CISC) architectures. The conversion of macro-instructions to sequences of micro-operations is not necessarily required.

Block 22 provides for monitoring the processor for one or more triggering events. Triggering events can include, but are not limited to memory latency events, sleep requests, and thread priority events. For example, a memory latency event can be a cache miss that requires data to be read from memory with a relatively long latency. In this case, the triggering event is communicated to the thread management logic from the execution pipeline. As another example, a memory latency event can be a predicted cache miss, which would require data or instructions to be fetched from memories that are farther down the memory hierarchy (with longer latency). Predicting cache misses can be done with any available technique. For example, one algorithm may assign a higher probability of load micro-operations missing in the cache when at decode time the load micro-operation is younger than an unresolved branch. The particular prediction technique is not central to the present discussion and the above example is only one way to generate a triggering event. A triggering event may also be the fact that a conditional branch is predicted with only weak confidence—in a situation where there are available logical threads in the wait state, it may be more efficient to execute these logical threads than to execute the current logical thread in a speculative mode. The strength of the prediction confidence may also depend upon the priority of the current logical thread.

Another type of triggering event is a sleep request, for example when a HALT or a MONITOR/MWAIT instruction is executed, which might instruct the thread management architecture to discontinue processing a logical thread until a store to a particular address is encountered or until a "revive" signal is received (for example an external interrupt). A triggering event might also be an interrupt command from another logical thread having a higher priority than the active logical thread. An example of such a high priority logical thread could be a screen update thread that would exhibit undesirable display "flickering" if access to a physical thread cannot be obtained. Furthermore, a thread priority event could occur according to a fairness rule that allows even or weighted access to simultaneous physical threads by the logical threads.

In any case, if it is determined that block 24 that one or more of the triggering events is present, the mapping can be halted at block 26 and the logical thread is switched to the drain state in block 28. Block 30 provides for holding the logical thread in the active state until one or more of the triggering events are present.

FIG. 3 shows one approach to maintaining a logical thread in the drain state in greater detail. The logical thread is monitored at block 32 for an interruptible point. As already discussed, as a logical thread is processed, macro-instructions are typically decoded into one or more uops. The uops can be marked as being either the beginning of a macro-instruction (BOM) or the end of a macro-instruction (EOM) as appropriate. In such a case, the interruptible point could correspond to a uop that is marked as an EOM. Such an approach would obviate certain difficulties associated with co-dependency and would in fact further enhance efficiency. The interruptible point could also merely correspond to the retirement of the last uop from the logical thread in question. If it is determined at block 34 that an interruptible point has been encountered, block 36 provides for switching the logical thread to the stall state. Block 38 provides for holding the logical thread in the drain state until an interruptible point is encountered.

Figure 4:
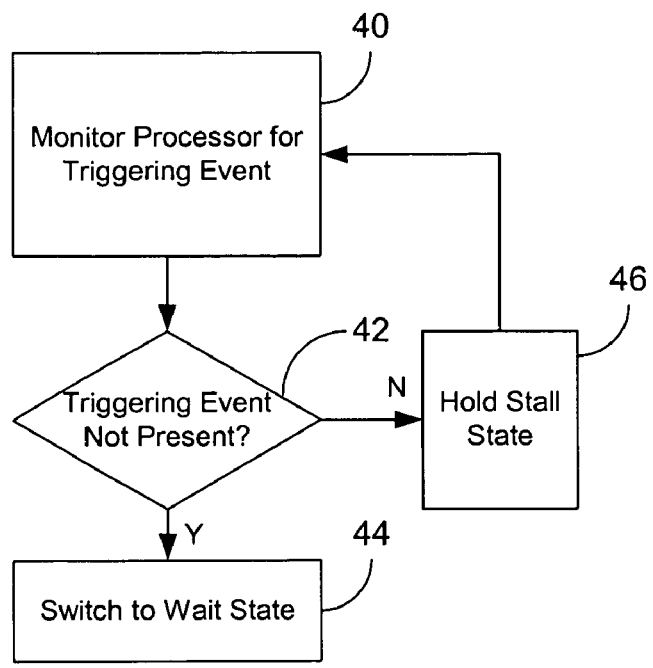
FIG. 4 is a flowchart of an example of a process of maintaining a logical thread in a stall state according to one embodiment of the invention.

Turning now to FIG. 4, one approach to maintaining a logical thread in the stall state is shown in greater detail. Specifically, block 40 provides for monitoring the processor for one or more triggering events. As already discussed, triggering events can include, but are not limited to latency events, sleep requests, thread priority events, etc. If it is determined that block 42 that none of the triggering events are present, block 44 provides for switching the logical thread to the wait state. Block 46 provides for holding the logical thread in the stall state until none of the triggering events are present. For example, the logical thread is kept in the stall state until a cache miss triggering event has been serviced and the data is present. It should be noted that the triggering event that causes a logical thread to be switched into the drain state may be the same or different from the triggering event that brings the logical thread out of the stall state.

It should be noted that the triggering event that causes a logical thread to be switched into the drain state may be the same or different from the triggering event that brings the logical thread out of the stall state. For example, the logical thread may be brought into stall state by executing a HALT instruction and may remain in the stall state until an external interrupt is received. As another example, the logical thread may be brought into the stall state by executing a load instruction that misses the cache and may be forced out of the stall state by receiving an external interrupt because servicing an external interrupt is often more important than waiting for a speculative cache miss to complete.

Figure 5:
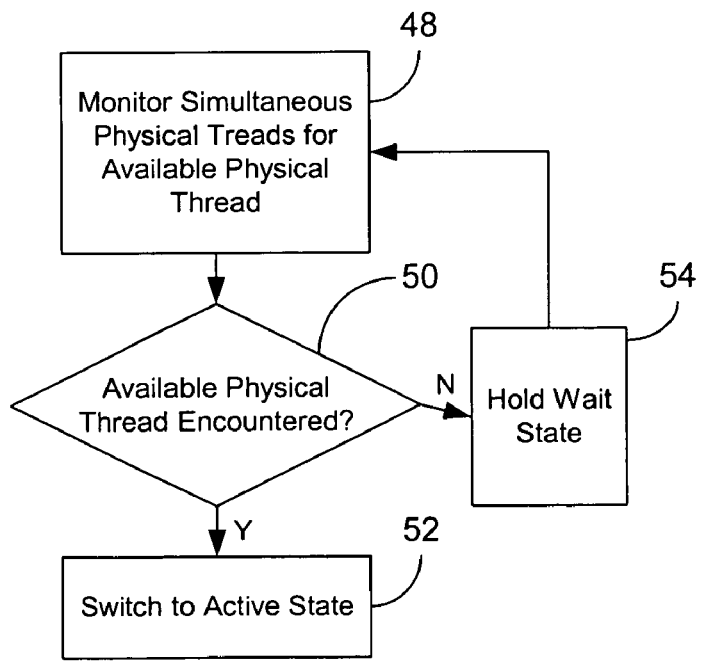
FIG. 5 is a flowchart of an example of a process of maintaining a logical thread in a wait state according to one embodiment of the invention.

FIG. 5 shows one approach to maintaining a logical thread in the wait state in greater detail. Specifically, the plurality of simultaneous physical threads is monitored at block 48 for an available physical thread. If it has been determined at block 50 that the available physical thread has been encountered, block 52 provides for switching the logical thread to the active state. Block 54 provides for holding the logical thread in the wait state until the available physical thread is encountered. Thus, all logical threads that are in the wait state are ready to be executed on a physical thread. When a physical thread becomes available, a logical thread is selected and moved to the active state. A physical thread can become available according to the examples discussed above. The selection of a logical thread can be based on, but not limited to, priority among logical threads and/or fairness requirements.

Turning now to FIG. 6, a thread management table 56 is shown. The thread management table 56 stores logical thread information, which can identify a state and one or more triggering events for each of the plurality of logical threads. For example, the illustrated $T_0$ is in the active state and may trigger on a specific memory request or an external store to monitor address AF09. Thread $T_1$, on the other hand, is in the stall state and triggers on the external store to monitor address AF09 and an "MWAIT" command. Additional information such as the IP to be used when activated and the hardware resource profile needed to support the logical threads can also be stored in the thread management table 56. In this regard, it should be noted that resources do not have to be assigned evenly across all of the logical threads. Resources include, but are not limited to, the temporary registers used in the processor to support fast speculative execution, where typically more resources mean faster execution. In fact, any platform resource in the system can be included in the hardware resource profile and controlled in this manner. For example, more demanding logical threads might be assigned more resources than less demanding logical threads. Resource assignment may also include, but is not limited to, the use of priority, performance feedback or fairness input. It should also be noted that the components of the thread management table 56 may be distributed throughout different portions of the processor, as demanded by practical implementation concerns, and need not be centrally located.

FIG. 7 shows an example in which the plurality of logical threads 58 is greater in number than the plurality of simultaneous physical threads 60. In such a case, the thread management architecture operates in a "throughput mode" because the simultaneous physical threads 60 can be kept as busy as possible by continuously activating logical threads that are ready for processing. In FIG. 8, on the other hand, the plurality of logical threads 62 is fewer in number than the plurality of simultaneous physical threads 64 in order to obtain a "speculative mode" of operation. Speculation can be achieved by assigning additional simultaneous physical threads to the same logical thread when program calls or other indirect program structures are encountered. In the case of a program call, for example, it may be inferred that a properly written program having a call instruction will return to the point of the call eventually. Accordingly, it may be desirable to start the additional simultaneous physical thread at the expected return point and test the speculated return against the actual return when the actual return occurs. If the test is successful, the uops that have been processed from the additional simultaneous physical thread are valid. It should also be noted that a thread management architecture can readily be configured to run in a "hybrid" mode of operation in which the above-described throughput and speculation modes operate concurrently.

Figure 9:
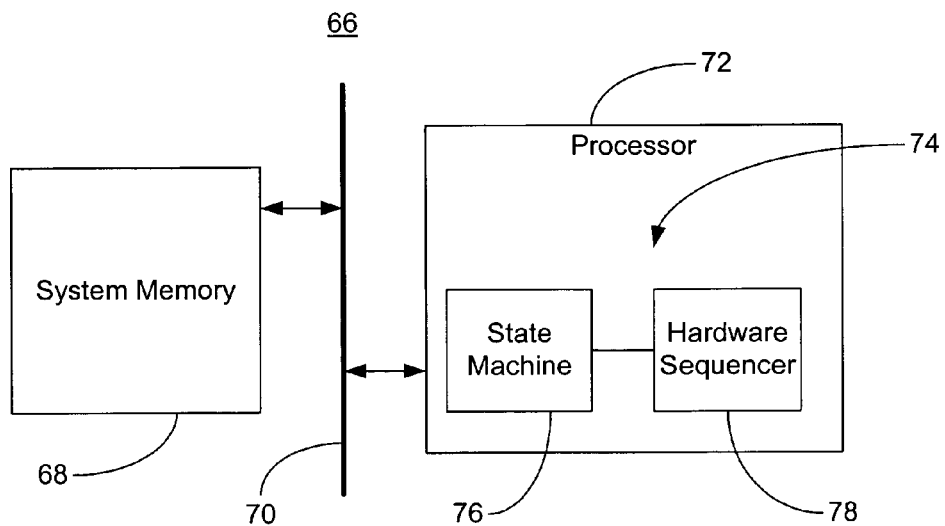
FIG. 9 is a diagram of an example of a computer system according to one embodiment of the invention.

Turning now to FIG. 9, a computer system 66 is shown. Computer system 66 has a system memory 68 to store macro-instructions. The system memory can include random access memory (RAM), read only memory (ROM), flash memory, etc. A system bus 70 is coupled to the system memory 68 and a processor 72 to retrieve the macro-instructions. The processor 72 has a thread management architecture 74 with a state machine 76 and a hardware sequencer 78. The state machine 76 can operate in a manner similar to that of the state machine illustrated in diagram 10 (FIG. 1). The state machine 76 supports a plurality of logical threads that corresponds to the macro-instructions with a plurality of simultaneous physical threads by maintaining each of the plurality of logical threads in one of a wait state, an active state, a drain state, and a stall state. The hardware sequencer 78 monitors the plurality of simultaneous physical threads for an available physical thread that corresponds to the logical threads. The state machine 76 holds the logical threads in the wait state until an available physical thread is encountered. It should be noted that although in the illustrated example, the macro-instructions corresponding to the plurality of logical threads are stored in the system memory, instructions and their corresponding uops may also be retrieved from "on-chip" memory such as trace cache, instruction cache, etc.

It should also be noted that the exact number of states in which a logical thread can exist may vary depending on the circumstances. For example, to facilitate an actual implementation, the drain state may be split into many states, where each sub-state represents a part of the "drain" operation.

Those skilled in the art can appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of supporting a plurality of logical threads with a plurality of simultaneous physical threads, comprising:

mapping macro-instructions associated with a first logical thread to a next instruction pointer of a simultaneous physical thread;

monitoring a processor for a triggering event at a first time;

holding the first logical thread in an active state until the triggering event is present;

halting the mapping and switching the first logical thread to a drain state if the triggering event is present;

monitoring the first logical thread for an interruptible point, wherein the interruptible point corresponds to either an end of a macro-instruction in the first logical thread, or a retirement of a final micro-operation associated with a first logical thread;

holding the first logical thread in the drain state until the interruptible point is encountered;

switching the first logical thread to a stall state if the interruptible point is encountered;

monitoring the processor for the triggering event at a second time;

holding the first logical thread in the stall state until the triggering event is not present;

switching the first logical thread to a wait state if the triggering event is not present;

monitoring the plurality of simultaneous physical threads for an available physical thread;

holding the first logical thread in the wait state until the available physical thread is encountered; and switching the first logical thread to the active state if the available physical thread is encountered.

2. The method of claim 1, wherein the triggering event includes at least one of a memory latency event, a sleep request and a thread priority event.

3. The method of claim 1, further including storing thread information in a thread management table, the thread information identifying a state, one or more triggering events and a linear instruction pointer for each of the plurality of logical threads.

4. A computer system comprising:

a random access memory to store macro-instructions;

a system bus coupled to the memory; and a processor coupled to the system bus to retrieve the macro-instructions, the processor including a thread management architecture having a state machine to:

support a plurality of logical threads that correspond to the macro-instructions with a plurality of simultaneous physical threads by maintaining each of the plurality of logical threads in one of a wait state, an active state, a drain state and a stall state;

map macro-instructions associated with a first logical thread to a next instruction pointer of a physical thread;

monitor the processor for a triggering event and hold the first logical thread in the active state until the triggering event is present;

monitor a first logical thread for an interruptible point and hold the first logical thread in the drain state until the interruptible point is encountered; and, monitor the processor for a triggering event and hold a first logical thread in the stall state until the triggering event is not present.

5. The computer system of claim 4, wherein the thread management architecture further includes a hardware sequencer, the hardware sequencer to monitor the plurality of simultaneous physical threads for an available physical thread that corresponds to a first logical thread, the state machine to hold the first logical thread in the wait state until the available physical thread is encountered.

6. The computer system of claim 4 further including a thread management table to store thread information, the thread information to identify a state, one or more triggering events and a linear instruction pointer for each of the plurality of logical threads.

7. The computer system of claim 6, wherein the thread information is to further identify a resource requirement profile for each of the plurality of logical threads.

8. The computer system of claim 4, wherein the plurality of logical threads is to be greater in number than the plurality of simultaneous physical threads.

9. The computer system of claim 4, wherein the plurality of logical threads is to be fewer in number than the plurality of simultaneous physical threads.

10. A method of managing a plurality of logical threads with a plurality of simultaneous physical threads, said method comprising:

mapping macro-instructions associated with a first logical thread to a next instruction pointer of a physical thread;

after detecting a first triggering event, halting the mapping and switching the first logical thread to a drain state;

after detecting an interruptible point in the drain state, the interruptible point corresponding to either an end of a macro-instruction in the first logical thread, or a retirement of a last micro-operation associated with the first logical thread, switching the first logical thread to a stall state;

after detecting that a second triggering event is not present, switching the first logical thread to a wait state;

monitoring a plurality of simultaneous physical threads for an available physical thread;

after encountering the available physical thread, switching the first logical thread to the active state.

11. The method of claim 10, wherein the triggering event includes at least one of a memory latency event, a sleep request and a thread priority event.

12. The method of claim 10, further including storing thread information in a thread management table, the thread information identifying a state, one or more triggering events and a linear instruction pointer for each of the plurality of logical threads.

13. The method of claim 10, wherein the thread information further includes a resource requirement profile for each of the plurality of logical threads.

14. The method of claim 10, wherein the plurality of logical threads is greater in number than the plurality of simultaneous physical threads.

15. The method of claim 10, wherein the plurality of logical threads is fewer in number than the plurality of simultaneous physical threads.

16. The method of claim 10, wherein the first triggering event and the second triggering event are a same event occurring at different points in time.

* * * * *